(12) United States Patent
Skeete

(10) Patent No.: US 10,092,083 B1
(45) Date of Patent: Oct. 9, 2018

(54) LUGGAGE-TOWING BODY HARNESS

(71) Applicant: Clayton D. Skeete, West Hempstead, NY (US)

(72) Inventor: Clayton D. Skeete, West Hempstead, NY (US)

( * ) Notice: Subject to any disclaimer, the term of this patent is extended or adjusted under 35 U.S.C. 154(b) by 0 days.

(21) Appl. No.: 15/906,107

(22) Filed: Feb. 27, 2018

(51) Int. Cl.
*A45C 13/38* (2006.01)
*A45F 3/08* (2006.01)
*A45F 3/14* (2006.01)
*A45F 3/00* (2006.01)
*A45F 3/04* (2006.01)
*A45C 5/14* (2006.01)
*B62B 5/06* (2006.01)

(52) U.S. Cl.
CPC ............ *A45F 3/08* (2013.01); *A45F 3/14* (2013.01); *A45C 5/14* (2013.01); *A45C 13/38* (2013.01); *A45F 2003/003* (2013.01); *A45F 2003/045* (2013.01); *A45F 2003/146* (2013.01); *B62B 5/068* (2013.01)

(58) Field of Classification Search
CPC ....... B62B 5/068; A45C 13/38; A45C 13/385; A45F 2003/045; A45F 2003/08; A45F 2003/10
USPC ............... 224/184, 922, 627, 628, 631, 637
See application file for complete search history.

(56) References Cited

U.S. PATENT DOCUMENTS

| 5,215,318 | A | 6/1993 | Capraro | |
|---|---|---|---|---|
| D367,142 | S | 2/1996 | Platt | |
| 5,626,270 | A * | 5/1997 | Tseng | A61M 5/1415 128/DIG. 6 |
| D491,359 | S | 6/2004 | Oh | |
| 6,764,231 | B1 * | 7/2004 | Shubert | F16M 13/04 396/419 |
| 7,007,956 | B1 * | 3/2006 | Pinon | B62B 5/068 224/184 |
| 7,051,910 | B2 * | 5/2006 | Sprague | A45C 13/30 224/262 |
| 7,484,737 | B2 * | 2/2009 | Satorius | A45F 3/14 280/1.5 |
| 8,181,381 | B1 * | 5/2012 | Kelleher | A01K 97/10 224/200 |
| 8,678,258 | B1 * | 3/2014 | Knight | A45F 3/08 224/628 |
| 9,101,200 | B2 * | 8/2015 | Dickson | A45F 5/021 |
| 9,365,229 | B2 * | 6/2016 | Ortega | B62B 1/10 |
| 2006/0196901 | A1 | 9/2006 | Benk | |
| 2006/0237918 | A1 | 10/2006 | Satorius | |
| 2007/0075105 | A1 | 4/2007 | Petrin | |
| 2008/0142562 | A1 * | 6/2008 | Cheng | A45F 3/08 224/628 |
| 2010/0282790 | A1 | 11/2010 | Peters | |
| 2014/0008402 | A1 * | 1/2014 | Dickson | A45F 5/021 224/184 |

* cited by examiner

*Primary Examiner* — Justin Larson

(57) ABSTRACT

A carrying assembly for providing hands free transportation of an object includes a T-shaped mount that may be positioned on a user's back. An upper strap is coupled to the T-shaped mount. The upper strap may be positioned over the user's shoulders. The upper strap retains the T-shaped mount on the user's back. A rod is coupled to the T-shaped mount. A free end of the rod may be selectively coupled to the object to be carried. A support strap is coupled between the T-shaped mount and the rod. The support strap supports the rod.

20 Claims, 5 Drawing Sheets

LUGGAGE-TOWING BODY HARNESS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of luggage, more specifically, a harness that is adapted to tow luggage.

SUMMARY OF THE INVENTION

An embodiment of the disclosure meets the needs presented above by generally comprising a T-shaped mount that may be positioned on a user's back. An upper strap is coupled to the T-shaped mount. The upper strap may be positioned over the user's shoulders. The upper strap retains the T-shaped mount on the user's back. A rod is coupled to the T-shaped mount. A free end of the rod may be selectively coupled to the object to be carried. A support strap is coupled between the T-shaped mount and the rod. The support strap supports the rod.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
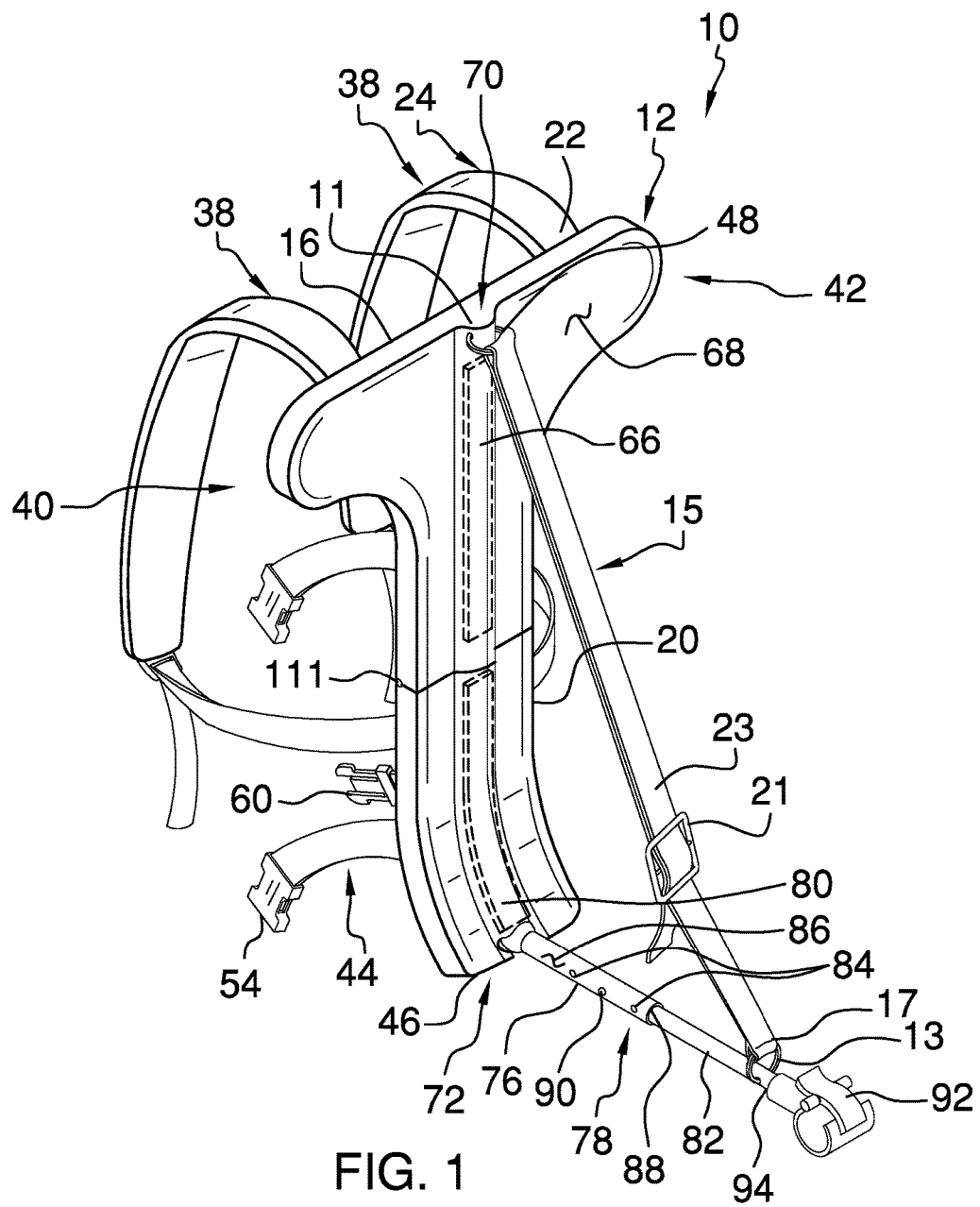
FIG. 1 is a perspective view of a carrying assembly according to an embodiment of the disclosure.
Figure 2:
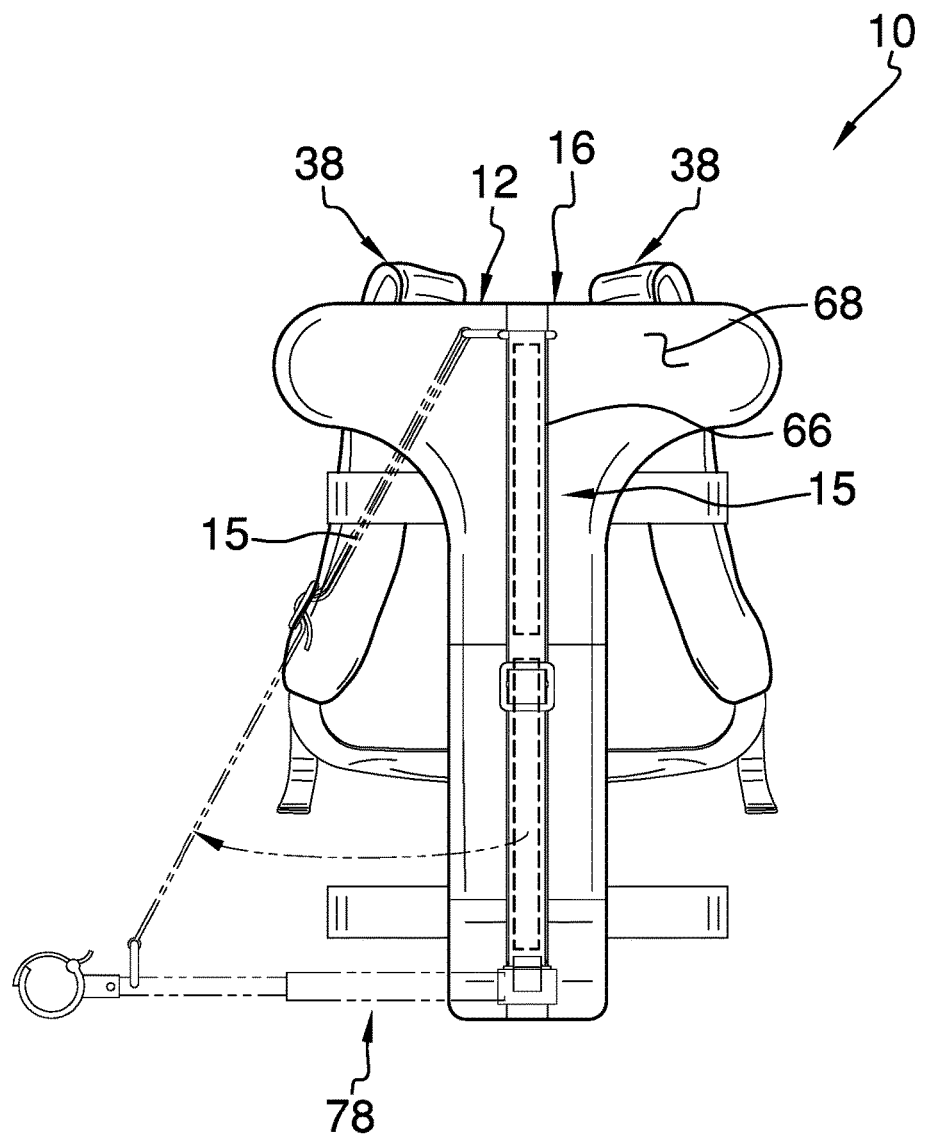
FIG. 2 is a back view of an embodiment of the disclosure.
Figure 3:
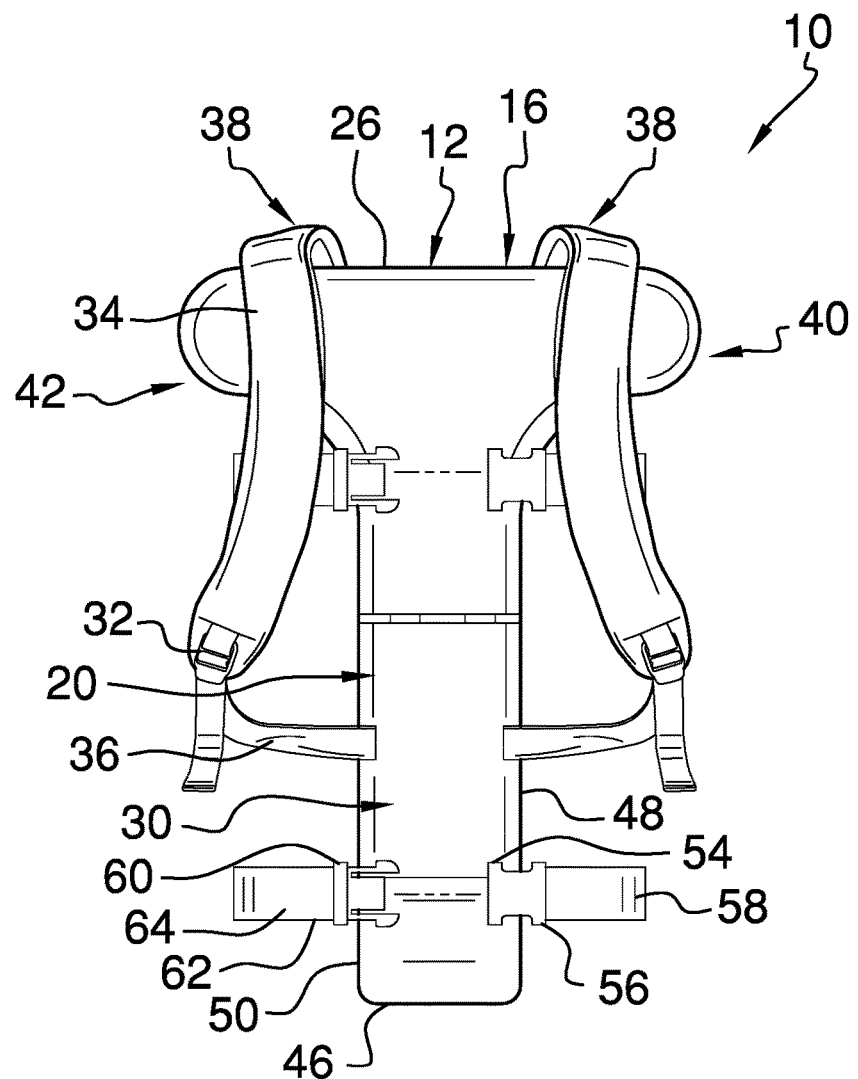
FIG. 3 is a front view of an embodiment of the disclosure.
Figure 4:
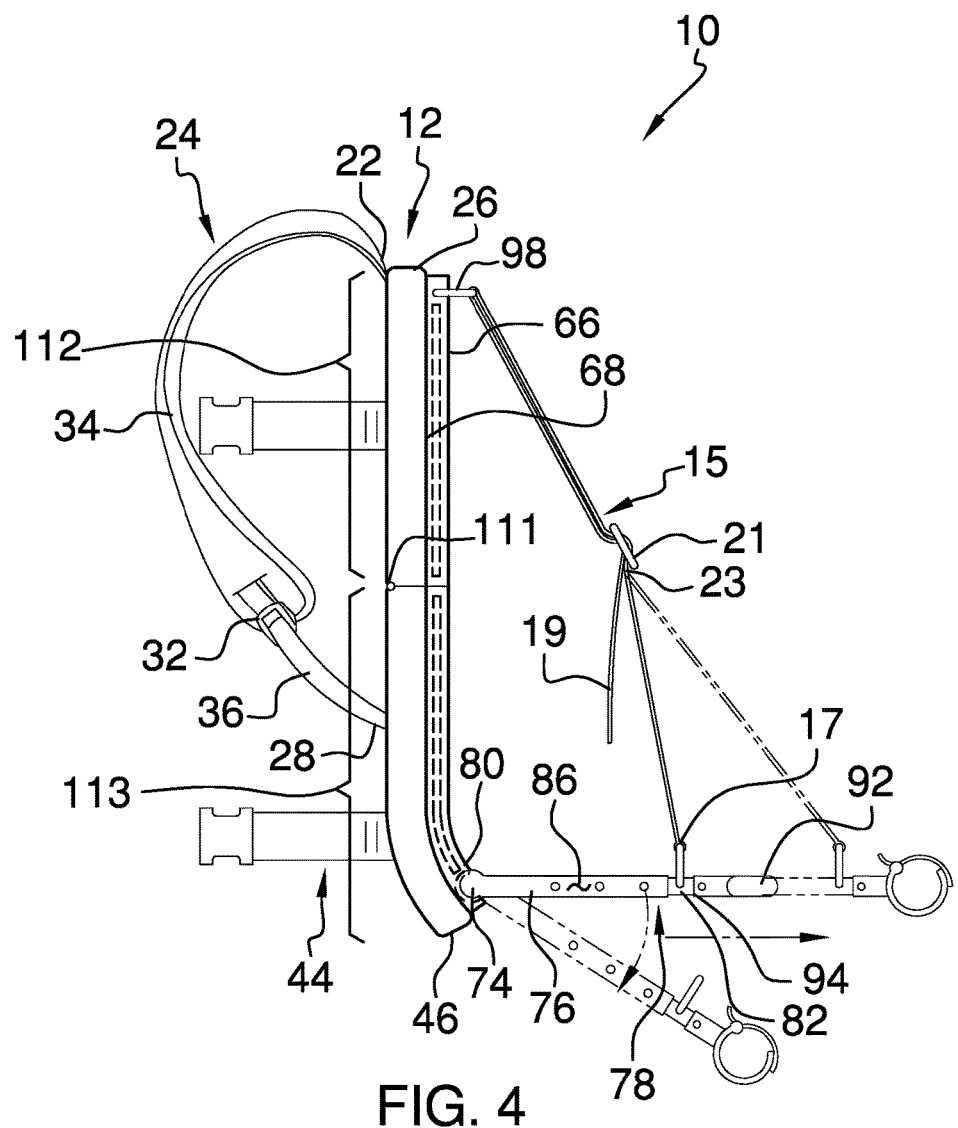
FIG. 4 is a left side view of an embodiment of the disclosure.
Figure 5:
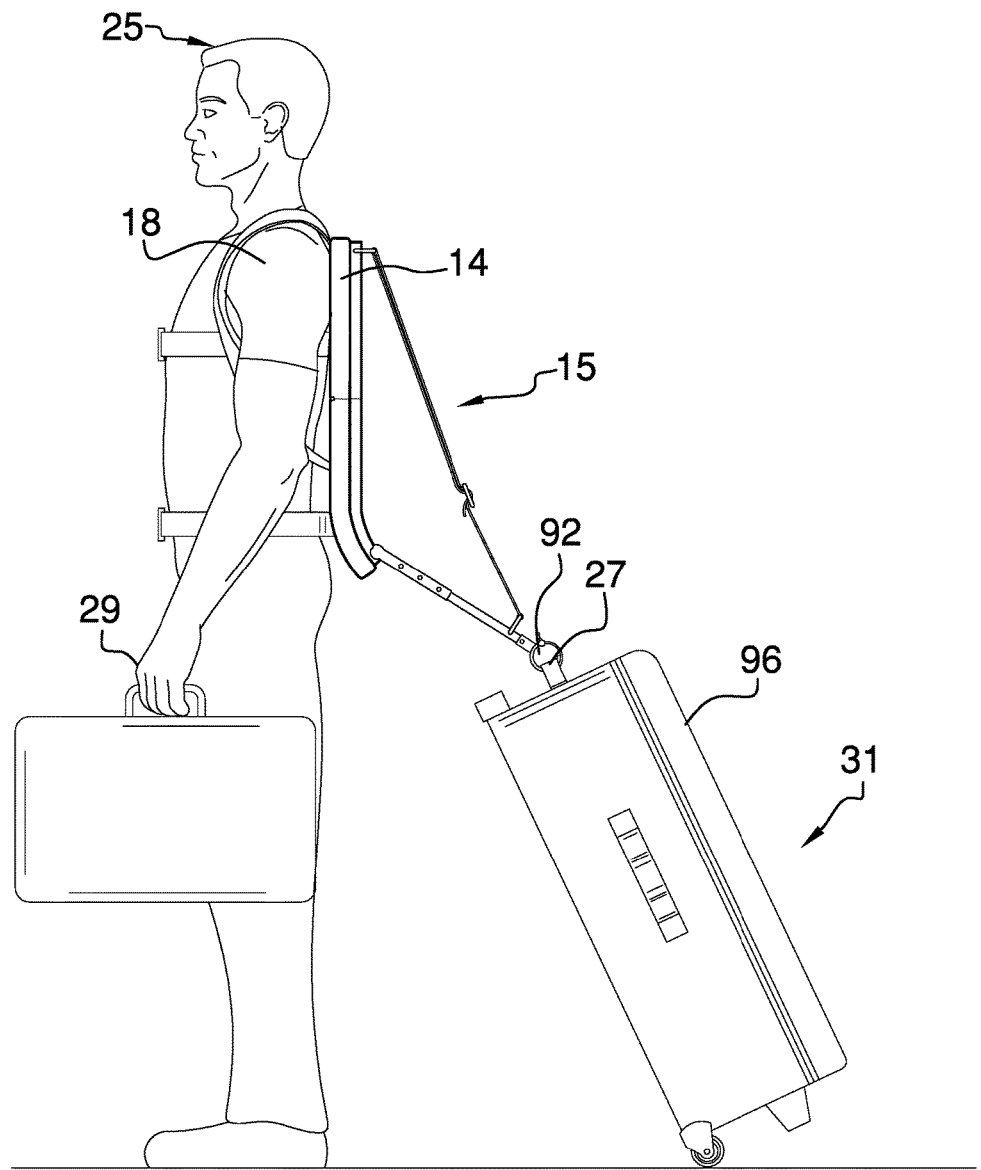
FIG. 5 is an in-use view of an embodiment of the disclosure.

As best illustrated in FIGS. 1 through 5, the carrying assembly 10 (hereinafter assembly) generally comprises a T-shaped mount 12 that may be positioned on a user's back 14. A top portion 16 of the T-shaped mount 12 is positioned proximate the user's shoulders 18. Moreover, a bottom portion 20 of the T-shaped mount 12 extends downwardly along the user's back 14. The top portion 16 of the T-shaped mount 12 may have a length between 15 cm and 25 cm and a height between 5 cm and 7 cm. Further, the bottom portion 20 of the T-shaped mount 12 may have a length between 25 cm and 35 cm and a width between 5 cm and 7 cm.

A top end 22 of an upper strap 24 is coupled to a top edge 26 of the top portion 16 of the T-shaped mount 12. Additionally, a bottom end 28 of the upper strap 24 is coupled to the bottom portion 20 of the T-shaped mount 12 proximate a center 30 of the bottom portion 20 of the T-shaped mount 12. The upper strap 24 may be positioned over the user's shoulder 18 so the upper strap 24 retains the T-shaped mount 12 on the user's back 14. A buckle 32 is coupled to a top portion 34 of the upper strap 24 and engages a bottom portion 36 of the upper strap 24 so the upper strap 24 has an adjustable length. Moreover, the upper strap 24 may have a selectable length between 30 cm and 60 cm. The upper strap 24 is one of a pair of the upper straps 38. Each of the pair of upper straps 38 is positioned proximate an associated one of a first lateral side 40 and a second lateral side 42 of the T-shaped mount 12.

A bottom strap 44 is coupled to the bottom portion 20 of the T-shaped mount 12 proximate a bottom end 46 of the T-shaped mount 12. The bottom strap 44 is one of a pair of the bottom straps 44 each positioned on an associated one a first lateral edge 48 and a second lateral edge 50 of the bottom portion 20 of the T-shaped mount 12. Each of the pair of bottom straps 44 is selectively extended around the user's torso 52. A buckle 54 is coupled to a free end 56 of a first one of the pair of bottom straps 58. Further, a clip 60 is coupled to a free end 62 of a second one of the pair of bottom straps 64. The buckle 54 engages the clip 60 so the first 58 and second 64 bottom straps are retained around the user's torso 52.

A support rib 66 extends outwardly from a back surface 68 of the T-shaped mount 12. The support rib 66 extends between a top end 70 and a bottom end 72 of the T-shaped mount 12. A first end 74 of a first portion 76 of a rod 78 is rotatably coupled to a bottom 80 of the support rib 66. Continuing, a second portion 82 of the rod 78 is slidably coupled to the first portion 76 of the rod 78. The rod is positionable at a selected lateral angle with respect to the T-shaped mount. Lastly, the rod 78 has a telescopically adjustable length that may range between 15 cm and 25 cm.

The support rib 80 and the T-shaped mount 12 are able to fold in half via a hinge 111. This implies that both the support rib 80 and the T-shaped mount 12 have an upper portion 112 and a bottom portion 113. The hinge 111 enables the bottom portion 113 and the upper portion 112 to rotate relative to one another such that the assembly 10 can be collapsed when not in use.

A plurality of retainer apertures 84 extends through an outer surface 86 of the first portion 76 of the rod 78. The plurality of retainer apertures 84 is evenly distributed between the first end 74 and a second end 88 of the first portion 76 of the rod 78. A retainer 90 is movably coupled to the second portion 82 of the rod 78. The retainer 90 extends through a selected one of the plurality of retainer apertures 84 so the second portion 82 of the rod 78 is retained at a selected position.

A hook 92 is coupled to a free end 94 of the second portion 82 of the rod 78. The hook 92 may selectively engage an object 31 to be transported. Moreover, the object 31 to be transported may be an article of luggage 96 of any conventional design. A top hoop 98 is movably coupled to a top 11 of the support rib 66. Further, a bottom hoop 13 is movably coupled to the second portion 82 of the rod 78 proximate the free end 94 of the second portion 82 of the rod 78.

A support strap 15 is looped through the top hoop 98. Further, a bottom end 17 of the support strap 15 is coupled to the bottom hoop 13. The support strap 15 supports the rod 78 at a selected vertical angle with respect to the T-shaped mount 12. A top end 19 of the support strap 15 extends through a buckle 21 positioned on a middle 23 of the support strap 15. The support strap 15 has an adjustable length that may range between 25 cm and 60 cm.

In use, the user 25 adjusts the support strap 15 to the desired length so the hook 92 is positioned proximate a handle 27 on the article of luggage 96 when the user 25 wears the assembly 10. Further, the rod 78 is adjusted to the selected length. The user 25 dons the assembly 10 and adjusts the pair of uppers straps 38 to the desired length. Continuing, the user 25 engages the hook 92 to the handle 27 on the article of luggage 96. Lastly, the user 25 walks while the article of luggage 96 is towed behind the user 25, leaving the user's hands 29 free.

With respect to the above description, it is to be realized that the optimum dimensional relationship for the various components of the assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A carrying assembly for providing hands free transportation of an object, said assembly comprising:
    a T-shaped mount configured to be positioned on a user's back;
    an upper strap coupled to said T-shaped mount wherein said upper strap is configured to be positioned over one of the user's shoulder wherein said upper strap retains said T-shaped mount on the user's back;
    a rod coupled to said T-shaped mount wherein a free end of said rod is configured to be selectively coupled to the object to be carried; and
    a support strap coupled between said T-shaped mount and said rod wherein said support strap supports said rod.

2. The assembly according to claim 1 wherein said T-shaped mount is configured to be positioned on the user's back wherein a top portion of said T-shaped mount is positioned proximate the user's shoulders.

3. The assembly according to claim 2 wherein a bottom portion of said T-shaped mount extends downwardly along the user's back.

4. The assembly according to claim 1 wherein a top end of said upper strap being coupled to a top edge of a top portion of said T-shaped mount.

5. The assembly according to claim 1 wherein a bottom end of said upper strap being coupled to a bottom portion of said T-shaped mount proximate a center of said bottom portion of said T-shaped mount.

6. The assembly according to claim 1 further comprising a buckle coupled to a top portion of said upper strap; wherein said buckle engages a bottom portion of said upper strap wherein said upper strap has an adjustable length.

7. The assembly according to claim 1 wherein said upper strap being one of a pair of upper straps.

8. The assembly according to claim 7 wherein each of said pair of upper straps being positioned proximate an associated one of a first lateral side and a second lateral side of said T-shaped mount.

9. The assembly according to claim 8 further comprising a bottom strap coupled to a bottom portion of said T-shaped mount proximate a bottom end of said T-shaped mount.

10. The assembly according to claim 9 wherein said bottom strap being one of a pair of bottom straps each positioned on an associated one of a first lateral edge, and a second lateral edge of said bottom portion of said T-shaped mount.

11. The assembly according to claim 10 wherein each of said pair of bottom straps being selectively extended around the user's torso.

12. The assembly according to claim 11 further comprising a support rib extending outwardly from a back surface of said T-shaped mount.

13. The assembly according to claim 12 wherein said support rib extends between a top end and a bottom end of said T-shaped mount.

14. The assembly according to claim 13 wherein a first end of a first portion of said rod being rotatably coupled to a bottom of said support rib.

15. The assembly according to claim 14 further comprising a second portion of said rod being slidably coupled to said first portion of said rod; wherein said rod has a telescopically adjustable length.

16. The assembly according to claim 15 wherein a hook coupled to a free end of said second portion of said rod; wherein said hook is configured to selectively engage the object to be carried.

17. The assembly according to claim 16 further comprising:
    a top hoop movably coupled to a top of said support rib;
    a bottom hoop movably coupled to said second portion of said rod proximate said free end of said second portion of said rod;
    wherein the support rib and the T-shaped mount are able to fold in half via a hinge;
    wherein both the support rib and the T-shaped mount are further defined with an upper portion and a bottom portion;
    wherein the hinge enables the bottom portion and the upper portion to rotate relative to one another such that the assembly is collapsed when not in use.

18. The assembly according to claim 17 wherein said support strap being looped through said top hoop; wherein a bottom end of said support strap is coupled to said bottom hoop.

19. The assembly according to claim 18 wherein said top end of said support strap being extended through a buckle positioned on a middle of said support strap; wherein said support strap has an adjustable length.

20. A carrying assembly for providing hands free transportation of an object, said assembly comprising:
- a T-shaped mount configured to be positioned on a user's back wherein a top portion of said T-shaped mount is positioned proximate the user's shoulders wherein a bottom portion of said T-shaped mount extends downwardly along the user's back;
- a top end of an upper strap being coupled to a top edge of said top portion of said T-shaped mount, a bottom end of said upper strap being coupled to said bottom portion of said T-shaped mount proximate a center of said bottom portion of said T-shaped mount wherein said upper strap is configured to be positioned over one of the user's shoulders wherein said upper strap retains said T-shaped mount on the user's back;
- a buckle coupled to a top portion of said upper strap wherein said buckle engages a bottom portion of said upper strap wherein said upper strap has an adjustable length;
- said upper strap being one of a pair of upper straps;
- each of said pair of upper straps being positioned proximate an associated one of a first lateral side and a second lateral side of said T-shaped mount;
- a bottom strap coupled to said bottom portion of said T-shaped mount proximate a bottom end of said T-shaped mount;
- said bottom strap being one of a pair of said bottom straps each positioned on an associated one of a first lateral edge and a second lateral edge of said bottom portion of said T-shaped mount, each of said pair of bottom straps being selectively extended around the user's torso;
- a support rib extending outwardly from a back surface of said T-shaped mount wherein said support rib extends between a top end and a bottom end of said T-shaped mount;
- a first end of a first portion of a rod being rotatably coupled to a bottom of said support rib, a second portion of said rod being slidably coupled to said first portion of said rod wherein said rod has a telescopically adjustable length;
- a hook coupled to a free end of said second portion of said rod wherein said hook is configured to selectively engage the object to be transported;
- a top hoop movably coupled to a top of said support rib;
- a bottom hoop movably coupled to said second portion of said rod proximate said free end of said second portion of said rod; and
- a support strap being looped through said top hoop wherein a bottom end of said support strap is coupled to said bottom hoop wherein said support strap supports said rod, a top end of said support strap being extended through a buckle positioned on a middle of said support strap wherein said support strap has an adjustable length.

* * * * *